United States Patent
Le Mouellic

(10) Patent No.: US 12,018,785 B2
(45) Date of Patent: Jun. 25, 2024

(54) DUCT-CONNECTING DEVICE

(71) Applicant: SOGEFI FILTRATION, Guyancourt (FR)

(72) Inventor: Bruno Le Mouellic, Carquefou (FR)

(73) Assignee: SOGEFI FILTRATION, Guyancourt (FR)

( * ) Notice: Subject to any disclaimer, the term of this patent is extended or adjusted under 35 U.S.C. 154(b) by 134 days.

(21) Appl. No.: 17/771,958

(22) PCT Filed: Oct. 15, 2020

(86) PCT No.: PCT/FR2020/051848
§ 371 (c)(1),
(2) Date: Apr. 26, 2022

(87) PCT Pub. No.: WO2021/084183
PCT Pub. Date: May 6, 2021

(65) Prior Publication Data
US 2022/0403965 A1    Dec. 22, 2022

(30) Foreign Application Priority Data
Oct. 28, 2019   (FR) ..................................... 1912045

(51) Int. Cl.
*F16L 37/098*   (2006.01)

(52) U.S. Cl.
CPC ....... *F16L 37/0985* (2013.01); *F16L 2201/10* (2013.01)

(58) Field of Classification Search
CPC ......................... F16L 37/0985; F16L 37/0847; F16L 37/0982
See application file for complete search history.

(56) References Cited

U.S. PATENT DOCUMENTS 4,786,085 A * 11/1988 Sauer ................... F16L 37/0985
285/915
5,318,332 A * 6/1994 Hohmann ........... F16L 37/0985
285/376

(Continued)

FOREIGN PATENT DOCUMENTS

GB          2244774 A   * 12/1991   .......... F16L 37/0985
WO       2017/194850        11/2017

OTHER PUBLICATIONS

International Search Report for PCT/FR2020/051848, dated Mar. 1, 2021, 4 pages.

(Continued)

*Primary Examiner* — Matthew Troutman
*Assistant Examiner* — Fannie C Kee
(74) *Attorney, Agent, or Firm* — NIXON & VANDERHYE

(57) ABSTRACT

A fluidic connection device couples a first end piece of a first tubing/equipment item and a second end piece of a second item/equipment item. The first constitutes a female end piece with a first tubular ending with a smooth internal face, the external face carrying a locking pin or claw. The second end piece constitutes a male end piece with a second tubular ending forming with the first tubular ending a mating part and whose smooth outer face forms a sealed link for the connection with the first tubular ending's smooth inner face. The second end piece includes: a skirt surrounding the mating part; and a spring tongue with a reception housing receiving the pin, locking the first and second end pieces together. The skirt is coupled to a rear part of the second tubular ending by an annular crown forming an introduction stop of the first tubular ending.

19 Claims, 4 Drawing Sheets

(56) References Cited

U.S. PATENT DOCUMENTS

| | | | | |
|---|---|---|---|---|
| 5,775,741 | A * | 7/1998 | Rice | F16L 37/0985 285/272 |
| 5,897,142 | A * | 4/1999 | Kulevsky | F16L 37/0982 285/308 |
| 6,199,919 | B1 * | 3/2001 | Kawasaki | F16L 37/0985 285/256 |
| 6,481,759 | B1 * | 11/2002 | Kawasaki | F16L 37/0985 285/331 |
| 2004/0232696 | A1 * | 11/2004 | Andre | F16L 37/0985 285/307 |
| 2005/0167980 | A1 * | 8/2005 | Bauer | F16L 37/0985 285/308 |
| 2007/0222216 | A1 * | 9/2007 | Bauer | F16L 37/0985 285/331 |
| 2015/0145243 | A1 | | 5/2015 | Dude |

OTHER PUBLICATIONS

Written Opinion of the ISA for PCT/FR2020/051848, dated Mar. 1, 2021, 6 pages.

\* cited by examiner

DUCT-CONNECTING DEVICE

This application is the U.S. national phase of International Application No. PCT/FR2020/051848 filed Oct. 15, 2020, which designated the U.S. and claims priority to FR Patent Application No. 1912045 filed Oct. 28, 2019, the entire contents of each of which are hereby incorporated by reference.

BACKGROUND OF THE INVENTION

Field of the Invention

The invention relates to the field of fluidic connection devices for ducts, in particular air intake ducts for motor vehicles.

Description of the Related Art

It is known to produce fluidic connection devices according to FIG. 1 for which a male end piece 200 of a fluidic duct is received into a female end piece 100 of a fluidic duct or coupler, the connection device comprising a male ending 100 of the male end piece received in a female ending 101 of the female end piece and a locking device having a spring tongue 102 and a pin 202 for which the spring tongue is disposed at a distal end of the female ending and the pin disposed being set back from the male ending of the male end piece.

In this known solution, the locking device extends the coupling zone, whereby the connection is lengthened. Document WO 2017/194850 A1 further describes the use of a spring tongue provided at a distal end of one of the end pieces, further requiring a peripheral ring to allow locking between the two end pieces. This solution makes the assembly more complex.

In view of the prior art, the present application proposes a fluidic connection device that is more compact and for which the coupling zone is dissociated from the locking zone and is protected.

SUMMARY OF THE INVENTION

More specifically, the present application proposes a fluidic connection device, by coupling a first end piece of a first tubing item or of a first equipment item such as a filtration device and a second end piece of a second tubing item or a second equipment item, the device comprising the first end piece and the second end piece, for which the first end piece constitutes a female end piece which comprises a first tubular ending whose external face carries at least one locking pin or claw and whose internal face is smooth, for which the second end piece constitutes a male end piece which comprises a second tubular ending forming with the first tubular ending a mating part and whose outer face is a smooth face intended to form with the smooth inner face of the first tubular ending a sealed link for the connection, the second end piece further comprising:
  a skirt intended to at least partially surround said mating part; and,
  a spring tongue provided with a reception housing for receiving said pin for locking the first and second end pieces together, and for which said skirt is coupled to a rear part of the second tubular ending by an annular crown forming, between the second tubular ending and said skirt, an introduction stop of the first tubular ending.

This connection device configuration protects the coupling zone in particular so as to achieve a sealed connection and makes it possible to shorten the connection end pieces. Moreover, the connection device of the invention, although shortened, has the advantage of not requiring any seal such as an O-ring. The number of pieces can be minimized.

The features set out in the following paragraphs may, optionally, be implemented. They can be implemented independently of each other or in combination with each other:

The skirt can be at least partially interrupted at the spring tongue.

The spring tongue may comprise two arms integral at a first one of their ends with the annular crown and linked at a second one of their ends by a plate provided with a snap-fastening wall with the locking pin, said housing being delimited by the annular crown, the arms and said snap-fastening wall.

The plate can carry an operating push button.

The skirt can carry an arch forming a protection bridge for the spring tongue and the operating pusher.

The external face of the first tubular ending can carry at the level of the mating part at least one angular keying axial rib, intended to cooperate with a complementary axial groove made at the level of the skirt and forming a projection of said skirt towards the free end of the second end piece, so that the axial rib engages the axial groove from the start of the mating of the endings of the end pieces.

Advantageously, the first end piece and the second end piece are each made in one piece.

The present application also relates to a coupler between a first tubing item or equipment item on the one hand, and a second tubing item on the other hand, comprising: —the male end piece formed by the second end piece of the connection device as described above, said second end piece being formed as a first end of the coupler to establish the connection with the first tubing item or the equipment item, and for which said first tubing item or equipment item comprises the female end piece formed by the first end piece of said connection device.

According to a first embodiment, the coupler may comprise a second end, preferably opposite the first end, the second end comprising a connection device, for connection onto a second tubing item or equipment item, of reversed gender with respect to the connection device of the present application. The coupler is such that the second end of the coupler comprises a female coupling ending extended at the free end thereof by a first retention and keying/foolproofing part while said second tubing item comprises a male insertion end piece provided with a second retention and keying part, complementary to said first retention and keying part, extending towards the end of the male insertion end piece by a male coupling ending.

Of course, the expression "reversed gender", for the connection device obtained on the side of the second end of the coupler, simply means that this second end receives an end piece similar or identical to that received by the first end: there is indeed an inverted orientation with respect to the first end. The coupler thus has a spring tongue at each end. This may possibly make it possible to dispose the coupler indifferently in one direction or another, in order to make two connection devices with the same coupler.

The coupler can in this case be a male-female coupler.

The coupler can be provided at the two ends thereof with snap-fastening means with a spring tongue intended to cooperate with snap-fastening stops disposed on an external face of tubular coupling endings of tubing items or equipment items.

The coupler may be provided at the two ends thereof with at least one internal keying groove intended to cooperate with at least one corresponding external keying rib corresponding to a tubular coupling ending of a tubing item or of an equipment item.

According to a second embodiment, a second end of the coupler comprises an end piece having a male ending of a connection device according to the present application, said second tubing item or equipment item comprises an end piece having a female ending of said connection device according to the present application, the coupler constituting a male-male coupler provided with a protective skirt at each of its ends.

The coupler can be made in one piece.

The coupler may include a bent part (elbow) located between two opposite ends of the coupler.

Each of the two ends of the coupler may be cylindrical and extend up to an annular junction line with the bent part.

Each of the two cylindrical ends of the coupler may have a cylinder length lower than an internal diameter delimited by the first end.

The invention and the variants thereof can make it possible, in general, to shorten the connection end pieces of equipment items, to standardize the production of end pieces for tubing items or equipment items, to produce bent couplers that are simple to put in place and provided with snap-fastening spring tongues.

BRIEF DESCRIPTION OF THE DRAWINGS

Other characteristics, details and advantages of the invention will appear when reading the detailed description below, and analyzing the appended drawings, in which.

DESCRIPTION OF EMBODIMENTS

The drawings and the description below contain, for the most part, elements which are certain. They may therefore not only be used to better understand the present invention, but also contribute to the definition thereof, if necessary.

The device of the invention applies particularly to air filtration systems for motor vehicles.

Figure 1:
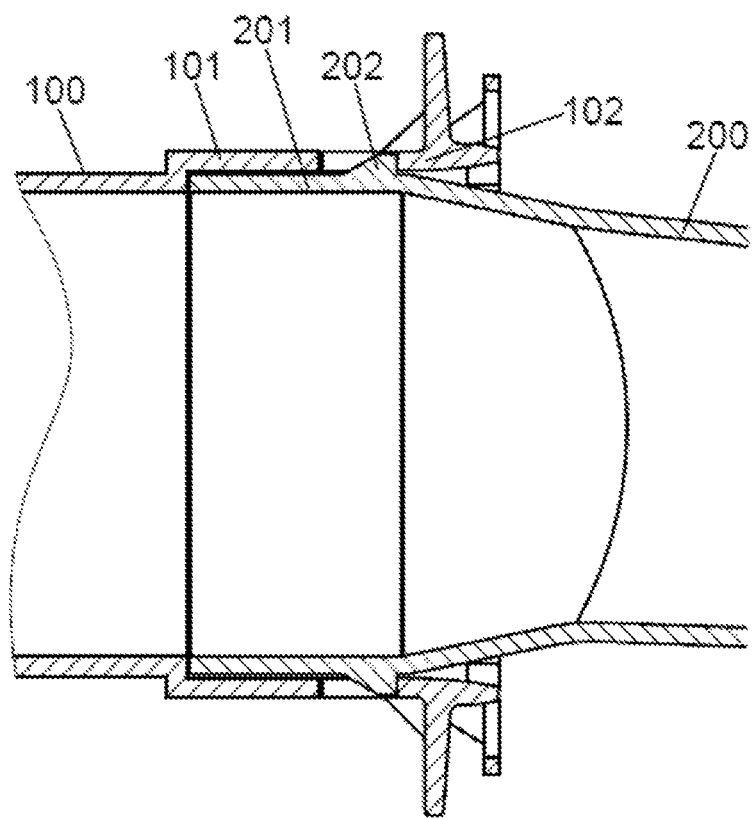
FIG. 1 shows a prior art connection device in a cross-sectional view.

As seen above, the fluidic connection device of the prior art, visible in FIG. 1, comprises a coupling portion and a locking portion which follow each other, the locking portion being located behind the coupling portion.

Figure 2:
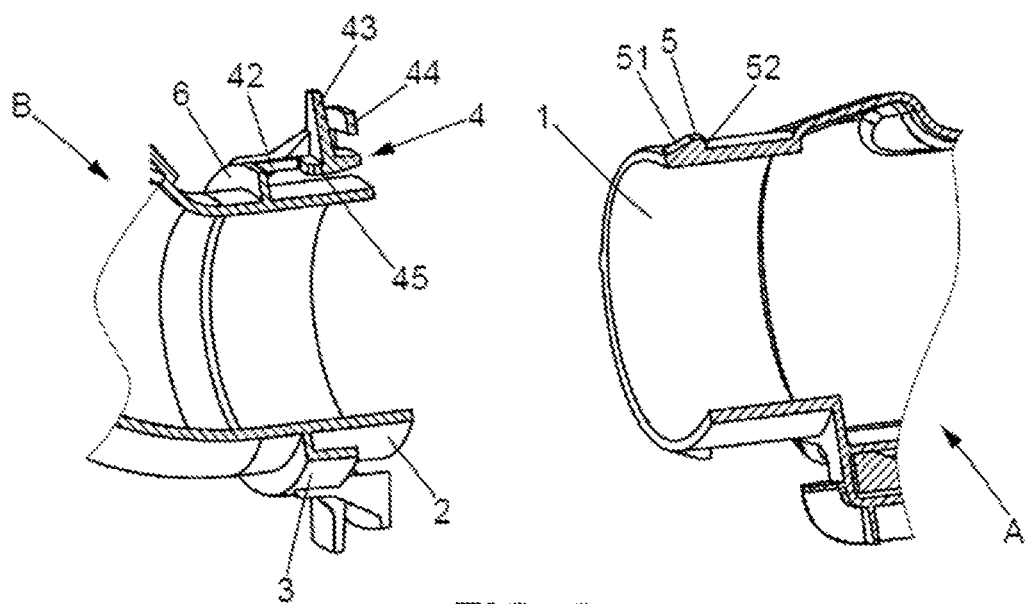
FIG. 2 shows a connection device according to the present application in cross-sectional perspective.

The invention of the present application relates to a fluidic connection device of the quick connector type between a duct portion B carrying a male end piece 2 and a duct portion carrying a female end piece 1 represented in FIG. 2. Locking the two portions one in the other is achieved by engaging retention lugs, made in the form of spring tongues 4 of the duct portion B carrying the male end piece, on the rear walls 52 of pins 5 of the duct carrying the female end piece. An axial retention is thus obtained, by typically being able to place pin 5 in a front segment adjacent to a front/leading edge of the female end piece 1.

The spring tongue 4 comprises a housing for receiving the pin 5. This housing is for example delimited by the annular crown 6, by two arms 42 integral at a first one of their ends with the annular crown 6 and linked at a second one of their ends, and by a plate 45 provided with a snap-fastening wall for snap-fastening with the locking pin 5.

A mating part (herein cylindrical) defining an annular contact zone is formed by covering portions having a cylindrical span distributed between the female end piece 1 and the male end piece 2. The axial retention of the two duct portions is obtained by the end of the female end piece 1 abutting against the annular crown or wall 6 and the wall/snap-fastening end carried by the plate 45 of the spring tongues 4 engaging against the rear wall 52 forming a locking stop of the pin 5. The pin 5 further comprises a ramp 51 allowing the spring tongue 4 to rise on the pin 5 while the end pieces are brought to mating. Preferably, the device comprises two locking devices arranged at 180° to each other. The spring tongues 4 of the retention lugs are flexible enough not to cause breakage over repeated use.

The plate 45 carries an operating pusher 43 which allows the plate to be disengaged from the pin. Although each spring tongue 4 is herein illustrated as being able to be actuated by an operating pusher 43 provided on the male end piece 2 and able to be actuated by a longitudinal thrust substantially parallel to the central axis of the female end piece 1 (axis which makes it possible to define an insertion direction for the male end piece 2), other modes of actuation can be provided. Optionally, the actuation could be enabled by pressing on or by stressing an elastically deformable actuation portion which is integral with the female end piece 1.

Figure 3:
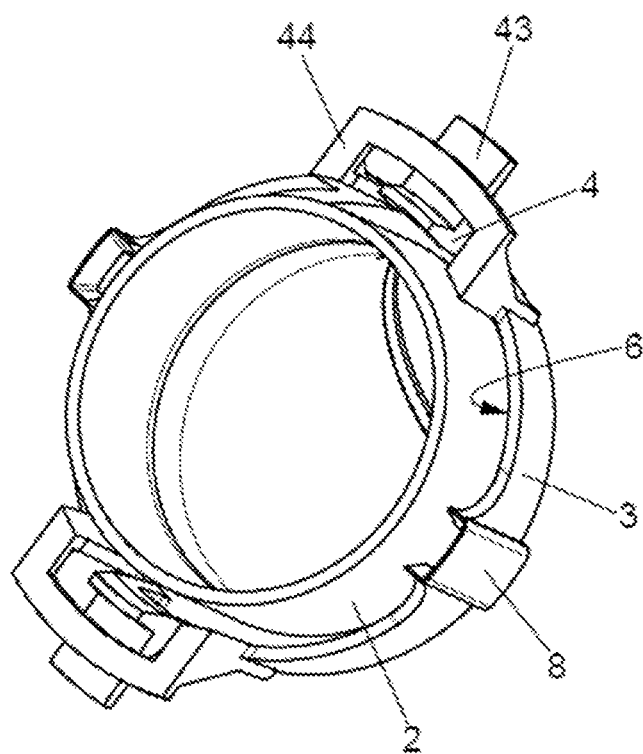
FIG. 3 shows a male part of the connection device according to the application in three-quarter face perspective view.

According to the invention, the fluidic connection device comprises an outer skirt 3 intended to at least partially surround the mating part. This outer skirt 3, more particularly shown in FIG. 3, frames the spring tongues 4 of the retention lugs which interrupt it and further comprises an arch 44 forming a protection bridge for the spring tongue 4 and the operating pusher 43.

The outer skirt 3 forms an annular reception space closed at one end thereof for the reception of a tubular ending herein forming the female connection part (female end piece 1). This annular space is internally delimited by a tube segment forming the internal face for the fluid passage. The tube segment is an insertion part to be inserted into the female end piece 1, which extends between a free annular edge and the annular region where the crown 6 is coupled, from the outside. This segment is thus stiffened from the outside at the peripheral connection/junction with the crown 6. The internal face of the insertion segment can be smooth, without relief and/or without internal shoulder. More generally, the internal face provided in the duct portion B including the male end piece 2 can be kept smooth over a greater distance than the longitudinal extension of the insertion segment (therefore both at the level of the insertion segment and in a segment that follows). As will be described later, the male end piece 2 can form part of a coupler with two connection ends, possibly in the form of a bent coupler. The absence of relief or stiffening element on the internal face of the side of the male end piece 2 with the external skirt 3 (male end piece 2 which is typically more complex than the female end piece 1) can then allow, if necessary, to lengthen the effective sealing length achieved in the mating part. The mating part can be constituted by the insertion segment of the male end piece 2 and the corresponding end portion of the female end piece 1, which overlap in the mated state.

To allow keying to take place as soon as mating starts, the skirt 3 has extensions towards the front of the mating part which carry the grooves 8.

The groove(s) 8, made in a projection or an extension of the skirt 3 towards the free end of the male end piece 2, are configured to allow engagement of the axial rib(s) 7, which start at the mating end of the female end piece 1, from the start of the mating of the coupling endings of the connection device.

The outer skirt 3 forms an annular reception space closed at one end thereof for the reception of a tubular ending herein forming the female connection part (female end piece 1). This annular space is internally delimited by a tube segment forming the internal face for the fluid passage. The tube segment is an insertion part to be inserted into the female end piece 1, which extends between a free annular edge and the annular region where the crown 6 is coupled, from the outside. This segment is thus stiffened from the outside at the peripheral connection/junction with the crown 6. The internal face of the insertion segment can be smooth, without relief and/or without internal shoulder. More generally, the internal face provided in the duct portion including the male end piece 2 can be kept smooth over a greater distance than the longitudinal extension of the insertion segment (therefore both at the level of the insertion segment and in a segment that follows). As will be described later, the male end piece 2 can form part of a coupler with two connection ends, possibly in the form of a bent coupler. The absence of relief or stiffening element on the internal face of the side of the male end piece 2 with the external skirt 3 (male end piece 2 which is typically more complex than the female end piece 1) can then allow, if necessary, to lengthen the effective sealing length achieved in the mating part. The mating part can be constituted by the insertion segment of the male end piece 2 and the corresponding end portion of the female end piece 1, which overlap in the mated state.

The pieces of the fluidic connection device are plastic pieces and according to the present application, the plastic/plastic sealing on the internal wall of the male part 1 and the external wall of the female part 2 is made on smooth walls devoid of seals. The sealing obtained in the framework of the invention being applied to air circuits is a sealing compatible with an engine air intake circuit or a vehicle passenger compartment air circuit.

As seen above, the mating part is separated from the locking zone because the snap-fastening/locking device is located on the outer skirt 3. This allows particularly compact implementation shapes. Thus, the ratio between the effective sealing length obtained in this mating part and the total length of the overlap can be greater than 80:100, preferably greater than or equal to 89:100. For example in the case of FIG. 4, the female end piece 1 can represent a sealing span having a length in the order of 30 or 35 mm, without the corresponding male end piece 2 being necessarily of a length significantly longer. There is no added seal (no technical seal), whereby an assembly operation is avoided. The span is substantially cylindrical in the non-limiting illustrated examples. This type of overlap between the mating part and the locking zone can advantageously contribute to improving compactness, knowing that the aforementioned ratio generally does not exceed 40:100 with an arrangement of the type shown in FIG. 1, one of the end pieces (carrying the actuating lugs in the example of FIG. 1) being much longer than the useful span to achieve sealing.

Figure 4:
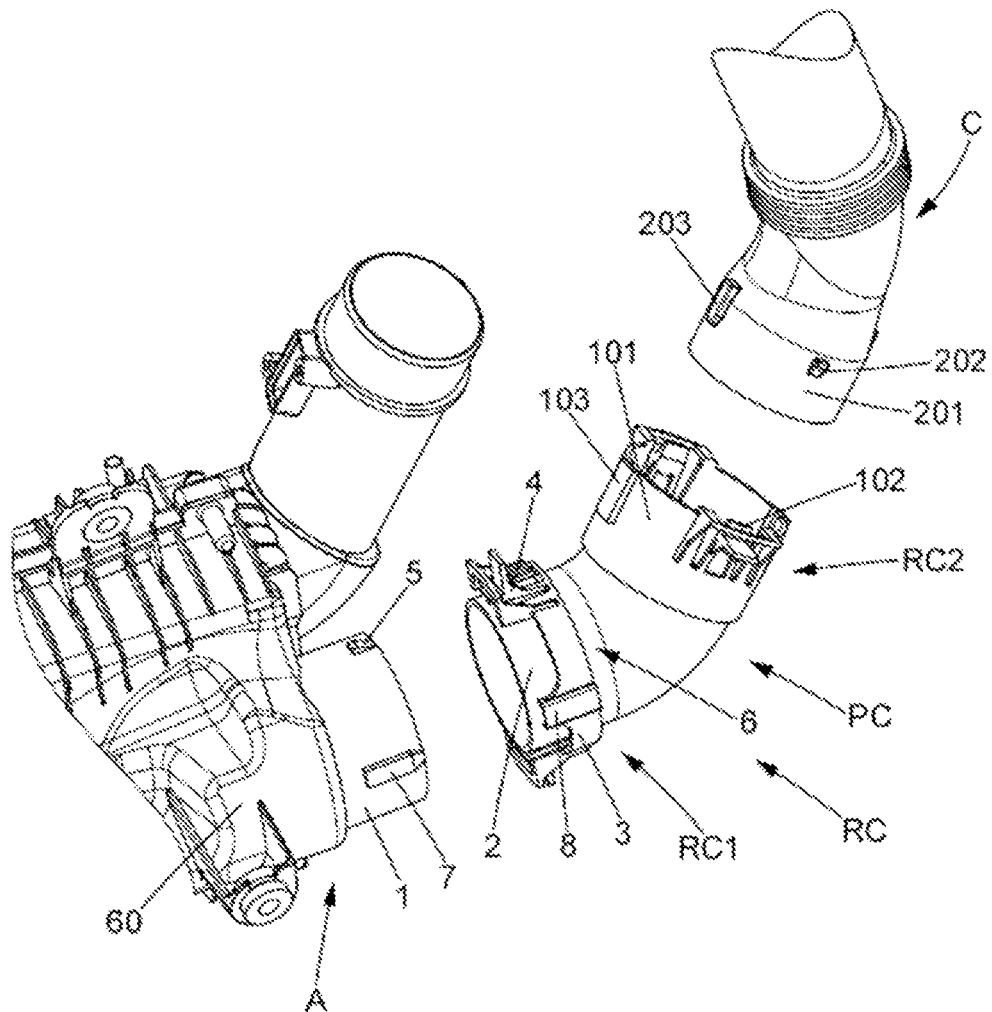
FIG. 4 shows a perspective view of a coupler according to an aspect of the application, of an equipment item and a tubing item.

The invention makes it possible in particular to produce RC connections between two tubing items or a tubing item and an equipment item. FIG. 4 represents a coupler RC, a first part of which is being coupled with an equipment item 60, for example an air filter, provided with a coupling ending A and a second part of which is being coupled to a duct C. The invention can be applied in the event that the equipment item 60 is replaced by a duct, as well as in the event that the duct C is replaced by an equipment item.

A first end RC1 of the coupler includes the male end piece 2 of a connection device of the invention while the ending A of said first tubing or equipment item 60 includes the female end piece 1 of said connection device of the invention.

On the other hand, in this exemplary embodiment, the second end RC2 of the coupler RC comprises a connection device, on a second tubing item or equipment item C, of the reversed gender to the connection device of the invention. That is to say that the second end of the coupler comprises a coupling ending or female end piece 101 extended at the free end thereof by a first retention 102 and keying part 103 while said second tubing item C comprises a male end piece, named male insertion end piece, provided with a second retention 202 and keying part 203, complementary to said first retention and keying part, which is followed towards the end of the male insertion end piece by a male coupling ending 201 (herein with the type of pins 5 similar to those described with reference to FIG. 2).

More generally, this second end RC2 of the coupler RC thus makes it possible to connect the coupler RC to another type of end piece, for example an end piece as that illustrated in FIG. 1.

This coupler RC constitutes in this case a male-female coupler provided at the two ends thereof with spring tongue 4 snap-fastening means intended to cooperate with snap-fastening stops, herein in the form of pins 5, disposed on an external face of tubular coupling endings for tubing or equipment items. Similarly, this male-female coupler is provided at the two ends thereof with internal keying grooves 8, 103 intended to cooperate with external keying ribs 7, 203 of a tubular coupling ending of a tubing item or of an equipment item.

Depending on the layout of the fluidic circuit, the keying means and the snap-fastening means can have different angular positions between the first end and the second end of the coupler.

The coupler RC can be made in one piece. It comprises, herein as illustrated in FIG. 4, a bent part PC located between two opposite ends of the coupler RC. Provision may be made for each of the two ends, which are herein cylindrical, to extend (with substantially the same cylindrical section for example) until a respective annular junction line with the bent part PC. For a gain in compactness, each of the two ends of cylindrical shape may have a cylinder length, as measured up to the junction line with the bent part, which is smaller than an internal diameter delimited by the first end.

The coupler RC shown is an bent coupler with a bent part PC but can also be a straight coupler if necessary.

An alternative embodiment, is that the first and the second end of the coupler are both provided with the male end piece of the coupling device according to the application, the coupler constituting a male-male coupler provided with a protective skirt 3 at each end thereof. In this case, the end piece of the duct C will also be identical to the end piece A of FIG. 2, the device for connecting the coupler and the tubing or equipment items being then identical to that of FIG. 2 on both sides of the coupler. Such an embodiment makes it possible to shorten the end pieces carried by the tubing and equipment items on both sides of the coupler RC.

In FIG. 4, the equipment item 60 is for example an air filter, optionally for a thermal combustion engine and the female end piece 1, formed directly on a casing, can make it possible to achieve sealing over a length greater than 20 or 25 mm, without the tubing item carrying the female end piece 1 protruding over more than 30 or 35 mm from the rest of the casing of the equipment item 60. Here the female end piece projects along a direction parallel to a length of the casing and/or to a plane of a support frame of an air filtration filter element mounted in the casing. The filtered air flow flows perpendicular to this plane to pass from an inlet to an outlet of the air filter. The female end piece 1 forms the externally projecting part of one among the inlet and the outlet of the air filter in this non-limiting example.

INDUSTRIAL APPLICATION

The invention can be applied in particular to coupling air distribution ducts with each other, to coupling an air intake duct and an engine or passenger compartment air filter casing of a motor vehicle or of an air conditioning system.

The invention is not limited to the examples described above purely by way of example, but it encompasses all the variants that a person skilled in the art may consider in the framework of the sought protection.

The invention claimed is:

1. A fluidic connection device to couple a first end piece of a first tubing item or of a first equipment item and a second end piece of a second tubing item or a second equipment item, the fluidic connection device comprising:
    the first end piece and the second end piece,
    wherein the first end piece constitutes a female end piece which comprises a first tubular ending provided with an external face that carries at least one locking pin or claw, the first tubular ending having an internal face that is smooth,
    wherein the second end piece constitutes a male end piece which comprises a second tubular ending forming with the first tubular ending a mating part, the second tubular ending having an outer face that is a smooth face configured to form with the smooth internal face of the first tubular ending a sealed link in a connection state in which the first end piece and the second end piece are directly engaged and locked together, said second end piece further comprising:
        a skirt configured to at least partially surround the mating part, and
        a spring tongue provided with a reception housing to receive said at least one locking pin or claw, the spring tongue locking the first end piece and the second end piece together,
    wherein the skirt is coupled to a rear part of the second tubular ending by an annular crown forming, between the second tubular ending and the skirt, an introduction stop of the first tubular ending,
    wherein the spring tongue comprises two arms each provided with two respective arm ends,
    wherein each of the two arms is integral, at a first one of the two respective arm ends, with the annular crown, and
    wherein the two arms are linked by a plate provided with a snap-fastening wall configured to snap-fasten with the at least one locking pin or claw, each of the two arms joining the plate by a second one of the two respective arm ends, said reception housing being delimited by the annular crown, the two respective arms and the snap-fastening wall.

2. The fluidic connection device according to claim 1, wherein the plate carries an operating pusher, and
    wherein the skirt carries an arch forming a protection bridge for the spring tongue and the operating pusher.

3. The fluidic connection device according to claim 2, wherein the first tubular ending extends around a central axis, the operating pusher protruding radially outwards from the plate and being configured to be actuated by a longitudinal thrust parallel to the central axis.

4. The fluidic connection device according to claim 2, wherein the external face of the first tubular ending carries, at the mating part, at least one axial rib for angular keying, configured to cooperate with a complementary axial groove provided at the skirt, and
    wherein the skirt includes a skirt projection towards a free end of the second end piece, with the complementary axial groove being formed at the skirt projection, so that the axial rib engages the complementary axial groove from a start of a mating of the first tubular ending and the second tubular ending.

5. The fluidic connection device according to claim 1, wherein the second end piece is part of a coupler configured to be connected to a first tubing or equipment at a first coupler connecting end and to a second tubing or equipment at a second coupler connecting end, the coupler comprising:
    the male end piece formed by the second end piece, said second end piece being formed as said first coupler connecting end to establish connection with the first tubing or equipment,
    wherein said first tubing or equipment comprises the female end piece formed by the first end piece, and
    wherein the coupler further comprises, at the second coupler connecting end, a spring tongue allowing snap-fastening with the second tubing or equipment.

6. The fluidic connection device according to claim 5, wherein each of the first coupler connecting end and the second coupler connecting end is cylindrical and extends until an annular junction line with a bent part, each of the first coupler connecting end and the second coupler connecting end having a cylinder length smaller than an internal diameter delimited by the first coupler connecting end.

7. The fluidic connection device according to claim 1, wherein the first end piece belongs to a filtration device.

8. The fluidic connection device according to claim 1, wherein the external face of the first tubular ending carries, at the mating part, at least one axial rib for angular keying, configured to cooperate with a complementary axial groove provided at the skirt, and
    wherein the skirt includes a skirt projection towards a free end of the second end piece, with the complementary axial groove being formed at the skirt projection, so that the axial rib engages the complementary axial groove from a start of a mating of the first tubular ending and the second tubular ending.

9. The fluidic connection device according to claim 1,
    wherein the second end piece is part of a coupler configured to be connected to a first tubing at a first coupler connecting end and to a second tubing at a second coupler connecting end, the coupler comprising: the male end piece formed by the second end piece, said second end piece being formed as said first coupler connecting end to establish connection with the first tubing, and
    wherein said first tubing comprises the female end piece formed by the first end piece.

10. A fluidic connection device to couple a first end piece of a first tubing item or of a first equipment item and a second end piece of a second tubing item or a second equipment item, the fluidic connection device comprising:
the first end piece and the second end piece,
wherein the first end piece constitutes a female end piece which comprises a first tubular ending provided with an external face that carries at least one locking pin or claw, the first tubular ending having an internal face that is smooth,
wherein the second end piece constitutes a male end piece which comprises a second tubular ending forming with the first tubular ending a mating part, the second tubular ending having an outer face that is a smooth face configured to form with the smooth internal face of the first tubular ending a sealed link in a connection state in which the first end piece and the second end piece are directly engaged and locked together, said second end piece further comprising:
a skirt configured to at least partially surround the mating part, and
a spring tongue provided with a reception housing to receive said at least one locking pin or claw, the spring tongue locking the first end piece and the second end piece together,
wherein the skirt is coupled to a rear part of the second tubular ending by an annular crown forming, between the second tubular ending and the skirt, an introduction stop of the first tubular ending,
wherein the external face of the first tubular ending carries, at the mating part, at least one axial rib for angular keying, configured to cooperate with a complementary axial groove provided at the skirt, and
wherein the skirt includes a skirt projection towards a free end of the second end piece, with the complementary axial groove being formed at the skirt projection, so that the axial rib engages the complementary axial groove from a start of a mating of the first tubular ending and the second tubular ending.

11. The fluidic connection device according to claim 10, wherein the skirt, which extends from the crown, is at least partly interrupted by the spring tongue.

12. The fluidic connection device according to claim 11, wherein the spring tongue comprises two arms each provided with two respective arm ends,
wherein each of the two arms is integral, at a first one of the two respective arm ends, with the annular crown, and
wherein the two arms are linked by a plate provided with a snap-fastening wall configured to snap-fasten with the at least one locking pin or claw, each of the two arms joining the plate by a second one of the two respective arm ends, said reception housing being delimited by the annular crown, the two respective arms and the snap-fastening wall.

13. The fluidic connection device according to claim 10, wherein the first end piece is a single piece and the second end piece is another single piece.

14. The fluidic connection device according to claim 10, wherein the second end piece is part of a coupler configured to be connected to a first tubing at a first coupler connecting end and to a second tubing at a second coupler connecting end, the coupler comprising: the male end piece formed by the second end piece, said second end piece being formed as said first coupler connecting end to establish connection with the first tubing, and
wherein said first tubing comprises the female end piece formed by the first end piece.

15. The fluidic connection device according to claim 14, wherein the first coupler connecting end is provided with at least one internal keying groove configured to cooperate with at least one complementary external keying rib of a tubular coupling ending.

16. The fluidic connection device according to claim 14, wherein the second coupler connecting end is provided with at least one internal keying groove configured to cooperate with at least one complementary external keying rib of a tubular coupling ending.

17. The fluidic connection device according to claim 14, wherein the first tubing belongs to a filtration device.

18. A fluidic connection device to couple a first end piece of a first tubing item or of a first equipment item and a second end piece of a second tubing item or a second equipment item, the fluidic connection device comprising:
the first end piece and the second end piece,
wherein the first end piece constitutes a female end piece which comprises a first tubular ending provided with an external face that carries at least one locking pin or claw, the first tubular ending having an internal face that is smooth,
wherein the second end piece constitutes a male end piece which comprises a second tubular ending forming with the first tubular ending a mating part, the second tubular ending having an outer face that is a smooth face configured to form with the smooth internal face of the first tubular ending a sealed link in a connection state in which the first end piece and the second end piece are directly engaged and locked together, said second end piece further comprising:
a skirt configured to at least partially surround the mating part, and
a spring tongue provided with a reception housing to receive said at least one locking pin or claw, the spring tongue locking the first end piece and the second end piece together,
wherein the skirt is coupled to a rear part of the second tubular ending by an annular crown forming, between the second tubular ending and the skirt, an introduction stop of the first tubular ending,
wherein the second end piece is part of a coupler configured to be connected to a first tubing at a first coupler connecting end and to a second tubing at a second coupler connecting end, the coupler comprising: the male end piece formed by the second end piece, said second end piece being formed as said first coupler connecting end to establish connection with the first tubing,
wherein said first tubing comprises the female end piece formed by the first end piece, and
wherein the second coupler connecting end, arranged is disposed opposite the first coupler connecting end, comprises the second coupler connecting end comprising
a connection device configured to connect to a second tubing, and
a female coupling ending extended at a free end thereof by a first retention and keying part while said second tubing comprises a male insertion end piece provided with a second retention and keying part, complementary to said first retention and keying part, extending towards an end of the male insertion end piece by a male coupling ending.

19. A fluidic connection device to couple a first end piece of a first tubing item or of a first equipment item and a second end piece of a second tubing item or a second equipment item, the fluidic connection device comprising:

the first end piece and the second end piece, wherein the first end piece constitutes a female end piece which comprises a first tubular ending provided with an external face that carries at least one locking pin or claw, the first tubular ending having an internal face that is smooth, wherein the second end piece constitutes a male end piece which comprises a second tubular ending forming with the first tubular ending a mating part, the second tubular ending having an outer face that is a smooth face configured to form with the smooth internal face of the first tubular ending a sealed link in a connection state in which the first end piece and the second end piece are directly engaged and locked together, said second end piece further comprising:

a skirt configured to at least partially surround the mating part, and a spring tongue provided with a reception housing to receive said at least one locking pin or claw, the spring tongue locking the first end piece and the second end piece together, wherein the skirt is coupled to a rear part of the second tubular ending by an annular crown forming, between the second tubular ending and the skirt, an introduction stop of the first tubular ending, wherein the second end piece is part of a coupler configured to be connected to a first tubing at a first coupler connecting end and to a second tubing at a second coupler connecting end, the coupler comprising: the male end piece formed by the second end piece, said second end piece being formed as said first coupler connecting end to establish connection with the first tubing, wherein said first tubing comprises the female end piece formed by the first end piece, and wherein the coupler is made in one piece and comprises a bent part located between the first coupler connecting end and the second coupler connecting end, which are opposite ends of the coupler.

* * * * *